United States Patent
Nakano

(10) Patent No.: US 9,435,241 B2
(45) Date of Patent: Sep. 6, 2016

(54) EXHAUST GAS PURIFICATION APPARATUS FOR INTERNAL COMBUSTION ENGINE

(75) Inventor: Takanori Nakano, Okazaki (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 158 days.

(21) Appl. No.: 14/008,258

(22) PCT Filed: Mar. 28, 2011

(86) PCT No.: PCT/JP2011/057653
§ 371 (c)(1),
(2), (4) Date: Sep. 27, 2013

(87) PCT Pub. No.: WO2012/131874
PCT Pub. Date: Oct. 4, 2012

(65) Prior Publication Data
US 2014/0017138 A1    Jan. 16, 2014

(51) Int. Cl.
*F01N 3/20* (2006.01)
*F01N 3/10* (2006.01)
(Continued)

(52) U.S. Cl.
CPC ........... *F01N 3/2066* (2013.01); *F01N 3/105* (2013.01); *F01N 3/2033* (2013.01); *F01N 3/2892* (2013.01); *F01N 3/36* (2013.01); *F01N 3/38* (2013.01); *F01N 2240/14* (2013.01); *F01N 2240/20* (2013.01); *F01N 2250/02* (2013.01); *F01N 2610/02* (2013.01);
(Continued)

(58) Field of Classification Search
USPC .................................. 422/173; 60/300, 320
See application file for complete search history.

(56) References Cited

U.S. PATENT DOCUMENTS

2007/0101703 A1   5/2007   Kanaya et al.
2008/0264042 A1   10/2008  Khadiya
(Continued)

FOREIGN PATENT DOCUMENTS

DE   10 2008 040 569   1/2010
JP   2006-112401 A     4/2006
(Continued)

OTHER PUBLICATIONS

Office Action issued in U.S. Appl. No. 14/114,381, on Sep. 22, 2015.
(Continued)

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An object of the invention is to satisfactorily remove solid materials derived from reducing agent and depositing on a wall of an exhaust passage in an exhaust gas purification apparatus for an internal combustion engine equipped with a selective reduction catalyst provided in the exhaust passage of the internal combustion engine and a reducing agent supply apparatus that supplies reducing agent derived from ammonia into the exhaust passage upstream of the selective reduction catalyst. To achieve the object, according to the invention, a fuel supply apparatus that supplies fuel into the exhaust passage upstream of the reducing agent supply apparatus and an ignition apparatus that ignites fuel supplied by the fuel supply apparatus to generate flame are provided. Solid materials derived from the reducing agent are removed by the flame generated by the fuel supply apparatus and the ignition apparatus.

3 Claims, 4 Drawing Sheets

(51) Int. Cl.
*F01N 3/28* (2006.01)
*F01N 3/36* (2006.01)
*F01N 3/38* (2006.01)

(52) U.S. Cl.
CPC .. *F01N 2610/03* (2013.01); *F01N 2610/1453* (2013.01); *Y02T 10/24* (2013.01); *Y02T 10/26* (2013.01)

(56) References Cited

U.S. PATENT DOCUMENTS

| | | | |
|---|---|---|---|
| 2010/0071355 A1 | 3/2010 | Brown et al. | |
| 2010/0269492 A1 | 10/2010 | Kotrba et al. | |
| 2012/0151902 A1 | 6/2012 | Yi et al. | |

FOREIGN PATENT DOCUMENTS

| | | |
|---|---|---|
| JP | 3892452 B2 | 3/2007 |
| JP | 2009-002213 | 1/2009 |
| JP | 2009-264222 A | 11/2009 |
| JP | 2010-270824 A | 12/2010 |
| JP | 2011-012643 | 1/2011 |
| JP | 2011-047293 | 3/2011 |
| JP | 2011-064069 | 3/2011 |

OTHER PUBLICATIONS

Notice of Allowance issued in U.S. Appl. No. 14/114381 on Apr. 25, 2016.

EXHAUST GAS PURIFICATION APPARATUS FOR INTERNAL COMBUSTION ENGINE

TECHNICAL FIELD

The present invention relates to an exhaust gas purification apparatus provided in an exhaust passage of an internal combustion engine, in particular to an exhaust gas purification apparatus in which reducing agent derived from ammonia is supplied to a selective reduction catalyst through a urea addition valve to thereby remove nitrogen oxides (NOx) in the exhaust gas.

BACKGROUND ART

Patent Document 1 describes a technology pertaining to an exhaust gas purification apparatus for an internal combustion engine equipped with a selective reduction catalyst provided in an exhaust passage of the internal combustion engine and an addition valve for adding reducing agent derived from ammonia to the exhaust gas before the exhaust gas flows into the selective reduction catalyst, in which a heat recovery device that recovers the heat of the exhaust gas flowing out of the selective reduction catalyst and transfers recovered heat to the vicinity of the addition valve is provided.

Patent Document 2 describes a technology pertaining to an exhaust gas purification apparatus for an internal combustion engine equipped with a selective reduction catalyst and an addition valve, in which a heater is provided in an exhaust passage extending from the addition valve to the selective reduction catalyst.

Patent Document 3 describes an exhaust gas purification apparatus for an internal combustion engine equipped with a catalyst carrier provided in an exhaust passage of the internal combustion engine, an addition valve for supplying fuel into an exhaust passage upstream of the catalyst carrier, and a glow plug for igniting fuel supplied through the addition valve.

Prior Art Document

Patent Document

Patent Document 1: Japanese Patent Application Laid-Open No. 2010-270624

Patent Document 2: Japanese Patent Application Laid-Open No. 2009-264222

Patent Document 3: Japanese Patent Application Laid-Open No. 2006-1112401

DISCLOSURE OF THE INVENTION

Problem to be Solved by the Invention

The technologies described in the aforementioned Patent Documents 1 and 2 are intended to remove solid matters generated from the reducing agent and depositing in the exhaust passage.

In the case where urea water solution is used as the reducing agent derived from ammonia, cyanuric acid and melanin etc. might be generated in addition to urea crystal. If, for example, aqueous solution of urea strikes on the wall of the exhaust passage, concretion occurs on the wall surface with evaporation of moisture. If the solid materials thus generated are exposed to an atmosphere of a temperature of 200° C. to 400° C., urea crystal, cyanuric acid and melanin are apt to be generated.

According to the technologies disclosed in Patent Documents 1 and 2 cited above, there is a possibility that the aforementioned solid materials might be exposed to an atmosphere of a temperature of 400° C. or lower in the process of heating the exhaust passage and the region near the addition valve by the heat recovery device or heater. In consequence, there is a possibility that the amount of urea crystal, cyanuric acid and melanin thus generated might increase.

The present invention has been made in view of the above-described situations, and an object of the present invention is to provide a technology that enables satisfactory removal of solid materials derived from reducing agent and depositing on the surface of the wall of an exhaust passage in an exhaust gas purification apparatus for an internal combustion engine equipped with a selective reduction catalyst provided in the exhaust passage of the internal combustion engine and a reducing agent supply apparatus that supplies reducing agent derived from ammonia into the exhaust passage upstream of the selective reduction catalyst.

Means for Solving the Problem

In the present invention, in an exhaust gas purification apparatus for an internal combustion engine equipped with a selective reduction catalyst provided in an exhaust passage of the internal combustion engine and a reducing agent supply apparatus that supplies reducing agent derived from ammonia into the exhaust passage upstream of the selective reduction catalyst, flame is delivered to a site (spot) on which the reducing agent supplied by the reducing agent supply apparatus strikes, thereby removing solid materials without involving generation of urea crystal, cyanuric acid or melanin.

Specifically, an exhaust gas purification apparatus according to the present invention comprises:

a selective reduction catalyst disposed in an exhaust passage of the internal combustion engine;

a reducing agent supply apparatus that supplies reducing agent derived from ammonia into the exhaust passage upstream of said selective reduction catalyst;

a fuel supply apparatus that supplies fuel into the exhaust passage upstream of said selective reduction catalyst; and an ignition apparatus that ignites fuel supplied by said fuel supply apparatus to generate flame, wherein said reducing agent supply apparatus, said fuel supply, apparatus, and said ignition apparatus are arranged in such a way that said flame reaches a site on the wall of the exhaust passage on which the reducing agent supplied by said reducing agent supply apparatus strikes.

With the exhaust gas purification apparatus for an internal combustion engine having the above-described construction, the site on the wall of the exhaust passage on which the reducing agent supplied from the reducing agent supply apparatus strikes is directly exposed to flame generated by the fuel addition apparatus and the ignition apparatus.

Solid materials derived from the reducing agent adhere to or deposit on the site on the wall of the exhaust passage on which the reducing agent strikes (which site will be hereinafter referred to as the "striking site"). When the solid materials derived from the reducing agent are exposed to an atmosphere of a temperature of 200° C. to 400° C. (which will be hereinafter referred to as "modifying atmosphere"), they will be modified into hard-to-melt materials. For example, in the case where an aqueous solution of urea is used as the reducing agent derived from ammonia, the solid materials derived from the reducing agent will be modified into cyanuric acid and/or melanin.

In contrast, if flame generated by the fuel supply apparatus and the ignition apparatus is delivered directly to the striking site, the aforementioned solid materials will be exposed to an atmosphere having a temperature sufficiently higher than the aforementioned modifying atmosphere. In this process, the temperature of the atmosphere to which the aforementioned solid materials are exposed rises not gradually through temperatures of the aforementioned modifying atmosphere but abruptly to a temperature higher than that of the aforementioned modifying atmosphere. In consequence, the aforementioned solid materials will be melted and removed without being modified into cyanuric acid or melanin.

Therefore, the exhaust gas purification apparatus for an internal combustion engine according to the present invention can remove solid materials derived from the reducing agent depositing on the wall surface of the exhaust passage or other portions satisfactorily.

If the flame generated by the fuel supply apparatus and the ignition apparatus reaches the reducing agent supply apparatus, a heat deterioration of the reducing agent supply apparatus might occur. In view of this, the reducing agent supply apparatus, the fuel supply apparatus, and the ignition apparatus may be arranged in such a way that the flame reaches the site on the wall of the exhaust passage on which the reducing agent supplied by the reducing agent supply apparatus strikes but does not reach the reducing agent supply apparatus. When this is the case, solid materials derived from the reducing agent can be removed without involving a heat deterioration of the reducing agent supply apparatus.

The exhaust gas purification apparatus for an internal combustion engine according to the present invention may further comprise a precatalyst disposed in the exhaust passage downstream of said fuel supply apparatus and said ignition apparatus and upstream of said reducing agent supply apparatus, and a guide plate that guides flame generated by said fuel supply apparatus and said ignition apparatus to said precatalyst and said striking site.

With this configuration, the same fuel supply apparatus and ignition apparatus can be used both to raise the temperature of the precatalyst and to remove the solid materials derived from the reducing agent. In consequence, the solid materials derived from the reducing agent can be removed favorably without an increase in the number of components.

Advantageous Effect of the Invention

According to the present invention, in an exhaust gas purification apparatus for an internal combustion engine equipped with a selective reduction catalyst provided in the exhaust passage of the internal combustion engine and a reducing agent supply apparatus that supplies reducing agent derived from ammonia into the exhaust passage upstream of the selective reduction catalyst, solid materials derived from the reducing agent and depositing on the wall surface of the exhaust passage can be removed favorably.

THE BEST MODE FOR CARRYING OUT THE INVENTION

In the following, specific embodiments of the present invention will be described with reference to the drawings. The dimensions, materials, shapes and relative arrangements etc. of the component that will be described in connection with the embodiments are not intended to limit the technical scope of the present invention only to them, unless particularly stated.

Embodiment 1

Figure 1:
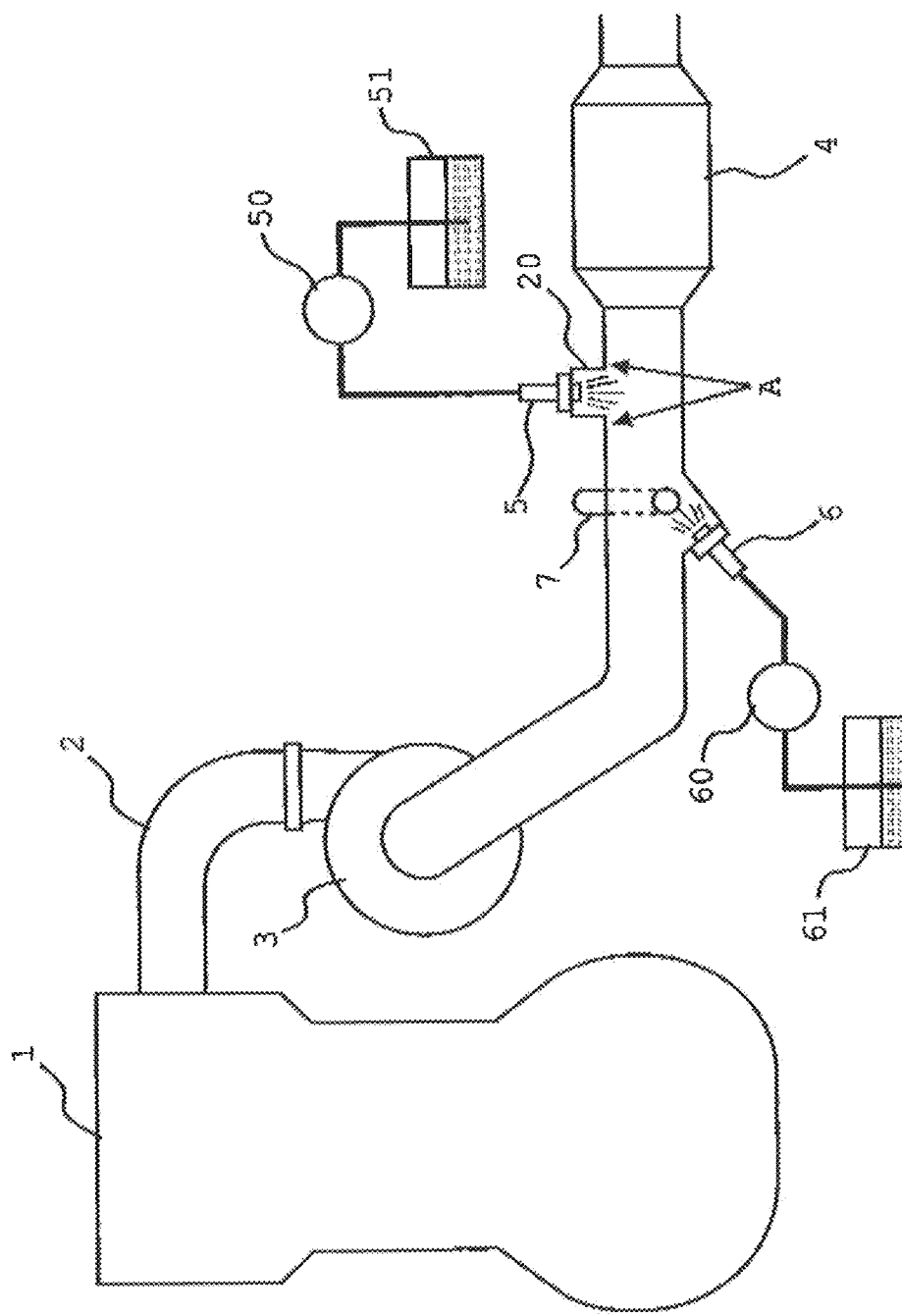
FIG. 1 is a diagram showing the basic configuration of the exhaust system of an internal combustion engine according to a first embodiment.
Figure 2:
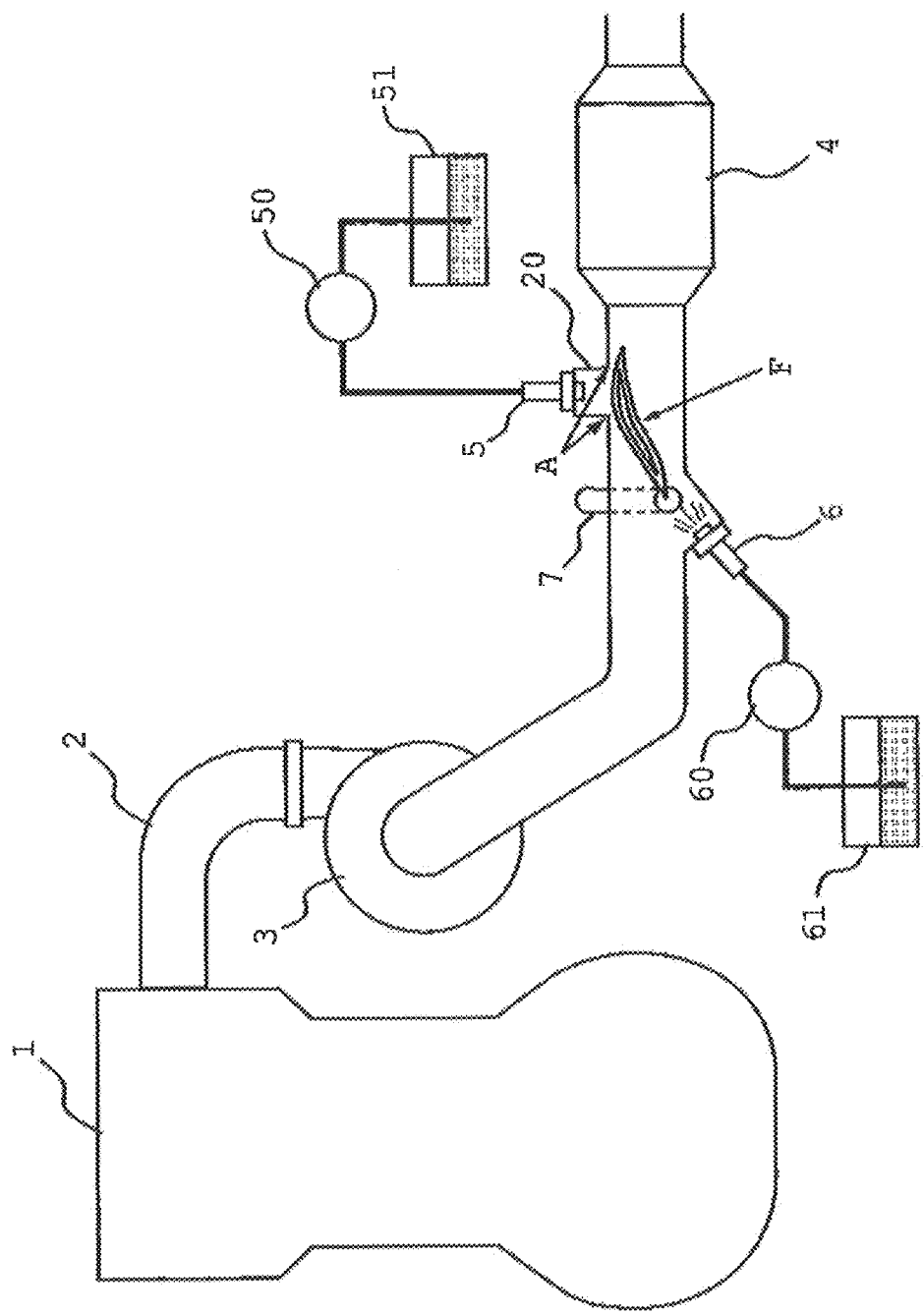
FIG. 2 is a diagram showing how the flame generated by a fuel addition valve and a glow plug develops.

Firstly, a first embodiment of the present invention will be described with reference to FIGS. 1 and 2. FIG. 1 is a diagram showing the basic configuration of the exhaust system of an internal combustion engine to which the present invention is applied. While the internal combustion engine 1 shown in FIG. 1 is a compression-ignition internal combustion engine (diesel engine), the engine may be a spark-ignition internal combustion engine (gasoline engine).

In FIG. 1, an exhaust passage 2 is connected to the internal combustion engine 1. The exhaust passage 2 is a passage through which burned gas (exhaust gas) discharged from the cylinders of the internal combustion engine 1 flows. A turbine 3 of a centrifugal supercharger (or turbo charger) is provided in the middle of the exhaust passage 2. A catalyst casing 4 is provided in the exhaust passage 2 downstream of the turbine 3.

The aforementioned catalyst casing 4 has a cylindrical casing, which houses a catalyst carrier on which a selective reduction catalyst is supported. The catalyst carrier may be for example, a monolithic substrate made of cordierite or Fe—Cr—Al based heat-resisting steel having a honeycomb cross section coated with an alumina-based or zeolite-based active component (carrier). In addition, a noble metal catalyst (e.g. platinum) having an oxidizing ability is supported on the catalyst carrier.

A reduction agent addition valve 5, a fuel addition valve 6 and a glow plug 7 are attached to the portion of the exhaust passage 2 between the turbine 3 and the catalyst casing 4.

The reducing agent addition valve 5 is provided in a recessed portion (or recess) 20 that is recessed outwardly in a radial direction of the exhaust passage 2 in the exhaust passage 2 upstream of the catalyst casing 4, so that the reducing agent addition valve 5 is not exposed in the interior of the exhaust passage 2. The reducing agent addition valve 5 is connected with a reducing agent tank 51 via a first pump 50. The first pump 50 sucks reducing agent contained in the reducing agent tank 51 and pumps the sucked reducing agent to the reducing agent addition valve 5. The reducing agent addition valve 5 injects the reducing agent pumped from the first pump 50 into the exhaust passage 2. The reducing agent addition valve 5, the first pump 50 and the reducing agent tank 51 constitute an embodiment of the reducing agent supply apparatus according to the present invention.

The reducing agent contained in the reducing agent tank 51 is a reducing agent derived from ammonia. The reducing agent derived from ammonia may be an aqueous solution of urea or ammonium carbamate. In this embodiment, it is assumed that an aqueous solution of urea is used as the reducing agent derived from ammonia.

After ejected from the reducing agent addition valve 5, the aqueous solution of urea is pyrolytically and hydrolytically decomposed in the exhaust gas or in the catalyst casing 4 to generate ammonia ($NH_3$). The ammonia ($NH_3$) thus generated is absorbed or stored by the selective reduction catalyst in the catalyst casing 4. The ammonia ($NH_3$) absorbed or stored in the selective reduction catalyst reacts with nitrogen oxides (NOx) contained in the exhaust gas to generate nitrogen ($N_2$) and water ($H_2O$). This means that ammonia ($NH_3$) functions as a reducing agent for nitrogen oxides (NOx).

The fuel addition valve 6 is disposed in the exhaust passage 2 upstream of the aforementioned reducing agent addition valve 5. The fuel addition valve 6 is connected with a fuel tank 61 via a second pump 60. The fuel tank 61 is a tank that contains fuel or the internal combustion engine 1. The first pump 60 sucks fuel contained in the fuel tank 61 and pumps the sucked fuel to the fuel addition valve 6. The fuel addition valve 6 injects the fuel supplied from the first pump 60 into the exhaust gas in the exhaust passage 2. The fuel addition valve 6, the first pump 60, and the fuel tank 61 constitute an embodiment of the fuel supply apparatus according to the present invention.

The glow plug 7 is disposed in such a way that the heat generating portion thereof is located in the vicinity of the ejection port of the fuel addition valve 6 or in the region over which the fuel ejected from the fuel addition valve 6 spreads. The glow plug 7 transduces electrical energy supplied from a battery or alternator that is not shown in the drawing into thermal energy to generate heat by the heat generating portion. The glow plug 7 generates heat by the heat generating portion at the time when fuel is ejected from the fuel addition valve 6 to ignite the fuel. Then, the fuel spreads in the exhaust passage 2 while burning with flame. In consequence, the temperature of the exhaust gas can be raised and materials adhering to the wall of the exhaust passage 2 can be burned or melted.

The glow plug 7 and the fuel addition valve 6 in this embodiment are arranged in such a way that the flame will reach a site (on the wall of the exhaust passage 2) in which solid materials derived from the reducing agent added through the reducing agent addition valve 5 are apt to adhere or deposit.

As the reducing agent (aqueous solution of urea) ejected from the reducing agent addition valve 5 strikes on the wall of the exhaust passage 2, solid materials deposit on the wall surface. When exposed to an atmosphere of a temperature of 200° C. to 400° C. (modifying atmosphere), such solid materials will be modified into hard-to-melt materials such as cyanuric acid and/or melanin. Then, the attempt of removing the solid materials by raising the exhaust gas temperature or by heating using a heater will cause the solid materials to be exposed to a modifying atmosphere during the temperature raising process or the heating process, possibly promoting the generation of cyanuric acid and/or melanin.

In contrast, in the case where flame generated by the fuel addition valve 6 and the glow plug 7 is delivered to the site in which the solid materials are apt to adhere or deposit, the aforementioned solid materials will be exposed to an atmosphere having a temperature sufficiently higher than the aforementioned modifying atmosphere. In addition, the temperature of the atmosphere to which the aforementioned solid materials are exposed rises not gradually through temperatures of the aforementioned modifying atmosphere but abruptly to a temperature higher than that of the aforementioned modifying atmosphere. In consequence, the aforementioned solid materials will be melted and removed without being modified into cyanuric acid or melanin.

In the case shown in FIG. 1, solid materials derived from the reducing agent are apt to adhere to or deposit on the portion connecting the exhaust passage 2 and the recess 20 (i.e. the portion indicated by arrows A in FIG. 1). Therefore, as shown in FIG. 2, the fuel addition valve 6 and the glow plug 7 are arranged in such a way that flame generated by the fuel addition valve 6 and the glow plug 7 (i.e. the flame indicated by arrow F in FIG. 2) is delivered to the aforementioned connecting portion A. Specifically, the fuel addition valve 6 is arranged in such a way that fuel ejected from the fuel addition valve 6 is directed to the aforementioned connecting portion A.

The above-described arrangement of the fuel addition valve 6 and the glow plug enables the removal of the solid materials derived from the reducing agent adhering to or depositing on the wall of the exhaust passage 2 without changing them into hard-to-melt materials. Moreover, since the fuel addition valve 6 and the glow plug 7 can be actuated without regard to the operation state of the internal combustion engine 1, it is possible to remove the solid materials derived from the reducing agent before the amount of the adhering or depositing solid materials becomes unduly large and/or to disable the operation of the fuel addition valve 6 and the glow plug 7 when the amount of adhering or depositing solid materials derived from the reducing agent is small.

If the reducing agent addition valve 5 is exposed to the flame generated by the fuel addition valve 6 and the glow plug 7, a harmful effect such as heat deterioration of the reducing agent addition valve 5 might be caused. However, since the reducing agent addition valve 5 in this embodiment is provided in the recess 20 in the exhaust passage 2 that is recessed outwardly in a radial direction of the exhaust passage 2, a situation that the reducing agent addition valve 5 is exposed to the flame can be prevented from occurring. Therefore, solid materials derived from the reducing agent can be removed without involving a heat deterioration of the reducing agent addition valve 5.

Embodiment 2

Next, a second embodiment of the present invention will be described with reference to FIGS. 3 and 4. Here, the components that are different from those in the above-described first embodiment will be described, and like components will not be described.

What is different in this embodiment from the above-described first embodiment is that solid materials derived from the reducing agent are removed using a glow plug and fuel addition valve for raising the catalyst temperature.

Figure 3:
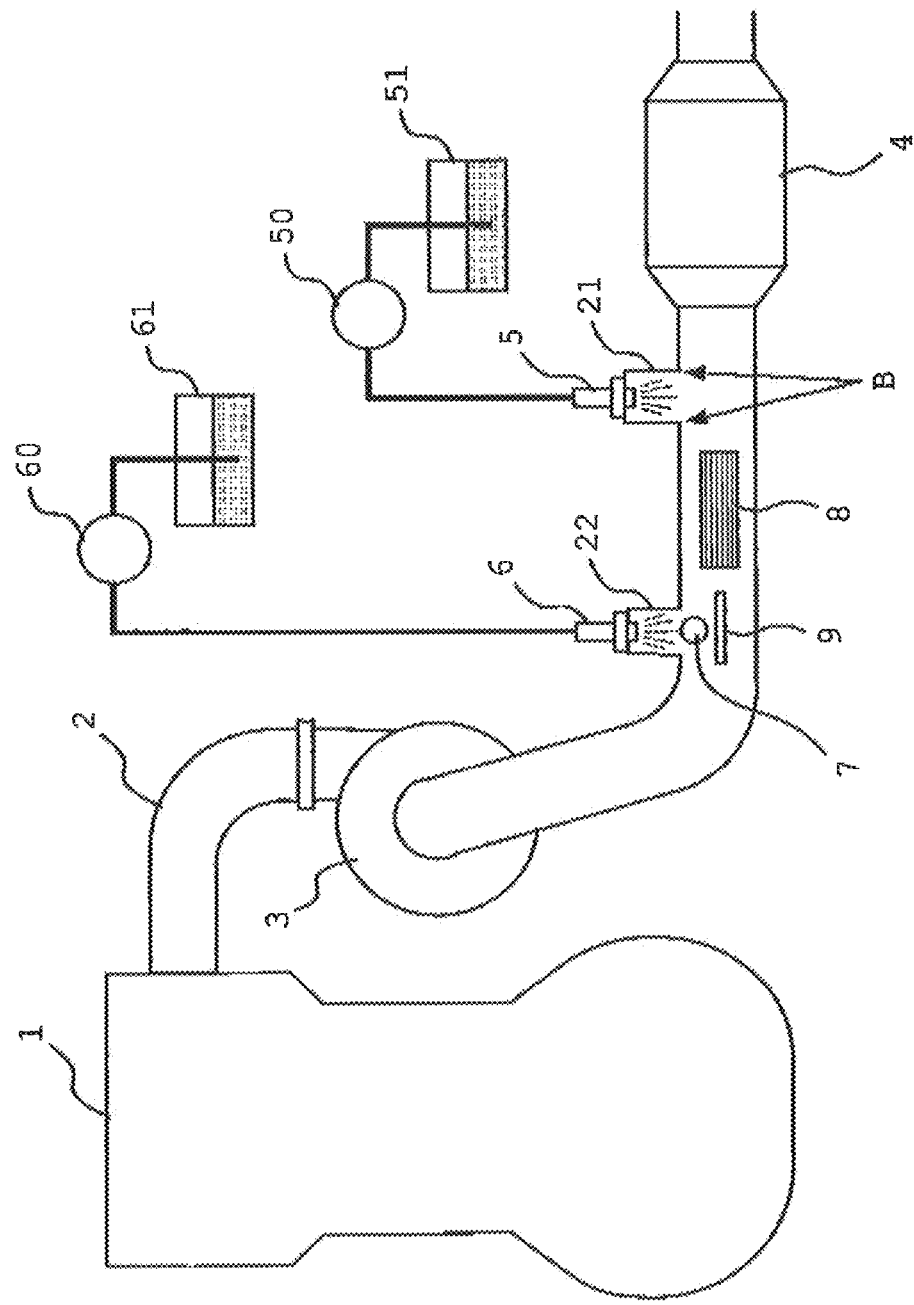
FIG. 3 is a diagram showing the basic configuration of the exhaust system of an internal combustion engine according to a second embodiment.
Figure 4:
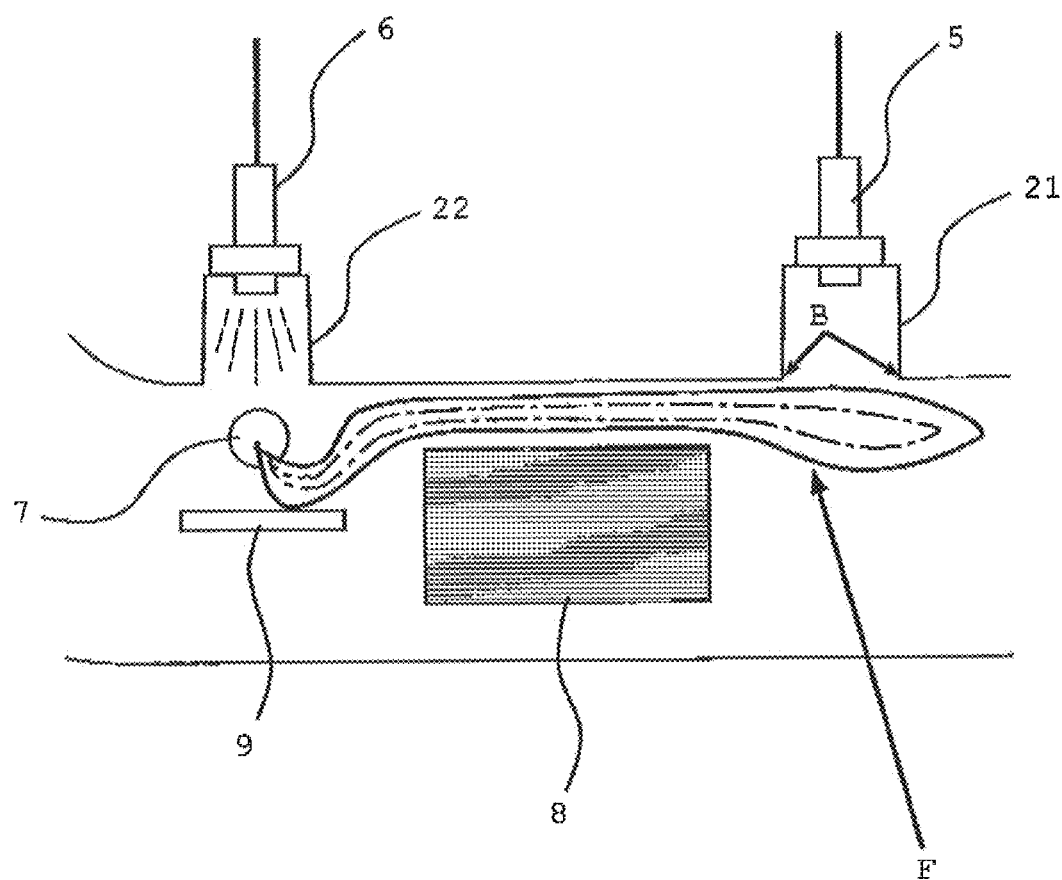
FIG. 4 is a diagram showing how the flame generated by a fuel addition valve and a glow plug develops.

FIG. 3 is a diagram showing the basic configuration of the exhaust system of an internal combustion engine 1 according to this embodiment. In FIG. 3, the components that are the same as those in the above-described first embodiment are designated by the same reference symbols. In FIG. 3, a particulate filter 8 on which an oxidation catalyst is supported is provided in the exhaust passage 2 downstream of a fuel addition valve 6 and a glow plug 7 and upstream of a reducing agent addition valve 5. The particulate filter 8 has a cylindrical shape having an outer diameter smaller than the inner diameter of the exhaust passage 2 and is disposed coaxial with the exhaust passage 2. The particulate filter 8 is an embodiment of the precatalyst according to the present invention. The particulate filter 8 may be replaced by a cylindrical catalyst carrier, on which the oxidation catalyst may be supported.

The reducing agent addition valve 5 in this embodiment is disposed in a recess 21 that is recessed outwardly in a radial direction of the exhaust passage 2 in the straight portion of the exhaust passage 2, so that the reducing agent addition valve 5 is not exposed in the interior of the exhaust passage 2. The fuel addition valve 6 is also provided in a recess 22 that is recessed outwardly in a radial direction of the exhaust passage 2 in the straight portion of the exhaust passage 2, so that the fuel addition valve 6 is not exposed in the interior of the exhaust passage 2. A glow plug 7 is disposed in such a way that the heat generating portion thereof is located in the vicinity of the ejection port of the fuel addition valve 6 or in the region over which the fuel ejected from the fuel addition valve 6 spreads, as with that in the above-described first embodiment.

When the fuel addition valve 6 and the glow plug 7 are actuated in the exhaust gas purification apparatus for an internal combustion engine having the above-described construction upon oxidizing particulate matter trapped on the particulate filter 8 or upon activating the catalyst supported on the particulate filter 8, the flame generated by the fuel addition valve 6 and the glow plug 7 is delivered to the vicinity of the particulate filter 8 by the effect of the pressure of the exhaust gas. Then, the temperature of the particulate filter 8 and the temperature of the exhaust gas flowing into the particulate filter 8 rise quickly. In consequence, particulate matter trapped in the particulate filter 8 is oxidized, and the oxidation catalyst supported on the particulate filter 8 is activated quickly.

As the reducing agent ejected from the reducing agent addition valve 5 strikes on the wall of the exhaust passage 2, solid materials derived from the reducing agent deposit on the wall surface. In the case shown in FIG. 3, solid materials derived from the reducing agent are apt to adhere to or deposit on the step portion connecting the recess 21 and the exhaust passage 2 (i.e. the portion indicated by arrows B in FIG. 3).

In view of this, in the exhaust gas purification apparatus for an internal combustion engine according to this embodiment, a guide plate 9 that guides the flame generated by the fuel addition valve 6 and the glow plug 7 to the particulate filter 8 and the aforementioned step portion B is provided. The guide plate 9 is provided at a position in the region over which the fuel ejected from the fuel addition valve 6 spreads, downstream of the heat generating portion of the glow plug 7. The guide plate 9 is arranged in such a way that the fuel or flame striking on the guide plate 9 is caused to pass through the gap between the particular filter 8 and the exhaust passage 2 and is delivered to the aforementioned step portion B.

For example, in the case shown in FIG. 3, the fuel ejected from the fuel addition valve 6 spreads in radial directions of the exhaust passage 2, and the guide plate 9 is arranged substantially parallel to the direction of the axis of the exhaust passage 2. As shown in FIG. 4, the guide plate 9 arranged in this way causes the flame generated by the fuel addition valve 6 and the glow plug 7 (i.e. the flame indicated by arrow F in FIG. 4) to strike on the guide plate 9 and then pass through the gap between the particulate filter 8 and the exhaust passage 2 to reach the aforementioned step portion B. In consequence, solid materials adhering to or depositing on the aforementioned step portion B are removed without being modified into hard-to-melt materials such as cyanuric acid and melanin. In addition, since heat of the flame is transferred to the outer circumference of the particulate filter 8 as the flame passes through the gap between the particulate filter 8 and the exhaust passage 2, the temperature of the particulate filter 8 can be raised quickly.

In the embodiment described above, the same components are used both to generate flame for raising the temperature of the particulate filter 8 and to generate flame for removing solid materials derived from the reducing agent. In consequence, solid materials derived from the reducing agent can be favorably removed without a significant increase in the number of components.

DESCRIPTION OF THE REFERENCE SYMBOLS 1 internal combustion engine
2 exhaust passage
3 turbine
4 catalyst casing
5 reducing agent addition valve
6 fuel addition valve
7 glow plug
8 particulate filter
9 guide plate
20 recess
21 recess
22 recess
50 first pump
51 reducing agent tank
60 second pump
61 fuel tank

The invention claimed is:

1. An exhaust gas purification apparatus for an internal combustion engine comprising:
    a selective reduction catalyst disposed in an exhaust passage of the internal combustion engine;
    a reducing agent supply apparatus that supplies reducing agent derived from ammonia into the exhaust passage upstream of said selective reduction catalyst;
    a fuel supply apparatus that supplies fuel into the exhaust passage upstream of said selective reduction catalyst; and
    an ignition apparatus that ignites fuel supplied by said fuel supply apparatus to generate flame,
    wherein said reducing agent supply apparatus, said fuel supply apparatus, and said ignition apparatus are arranged in such a way that said flame reaches a striking site on the wall of the exhaust passage on which the reducing agent supplied by said reducing agent supply apparatus strikes.

2. An exhaust gas purification apparatus for an internal combustion engine according to claim 1, wherein said reducing agent supply apparatus, said fuel supply apparatus, and said ignition apparatus are arranged in such a way that said flame reaches said striking site but does not reach said reducing agent supply apparatus.

3. An exhaust gas purification apparatus for an internal combustion engine according to claim 1, further comprising:
    a precatalyst disposed in the exhaust passage downstream of said fuel supply apparatus and said ignition apparatus and upstream of said reducing agent supply apparatus, and having an outer diameter smaller than said exhaust passage; and
    a guide plate that guides flame generated by said fuel supply apparatus and said ignition apparatus to said precatalyst and said striking site.

* * * * *